Feb. 2, 1965
G. W. DREYER
3,168,467
SELF-CLEANING STRAINERS
Filed July 20, 1962
3 Sheets-Sheet 1
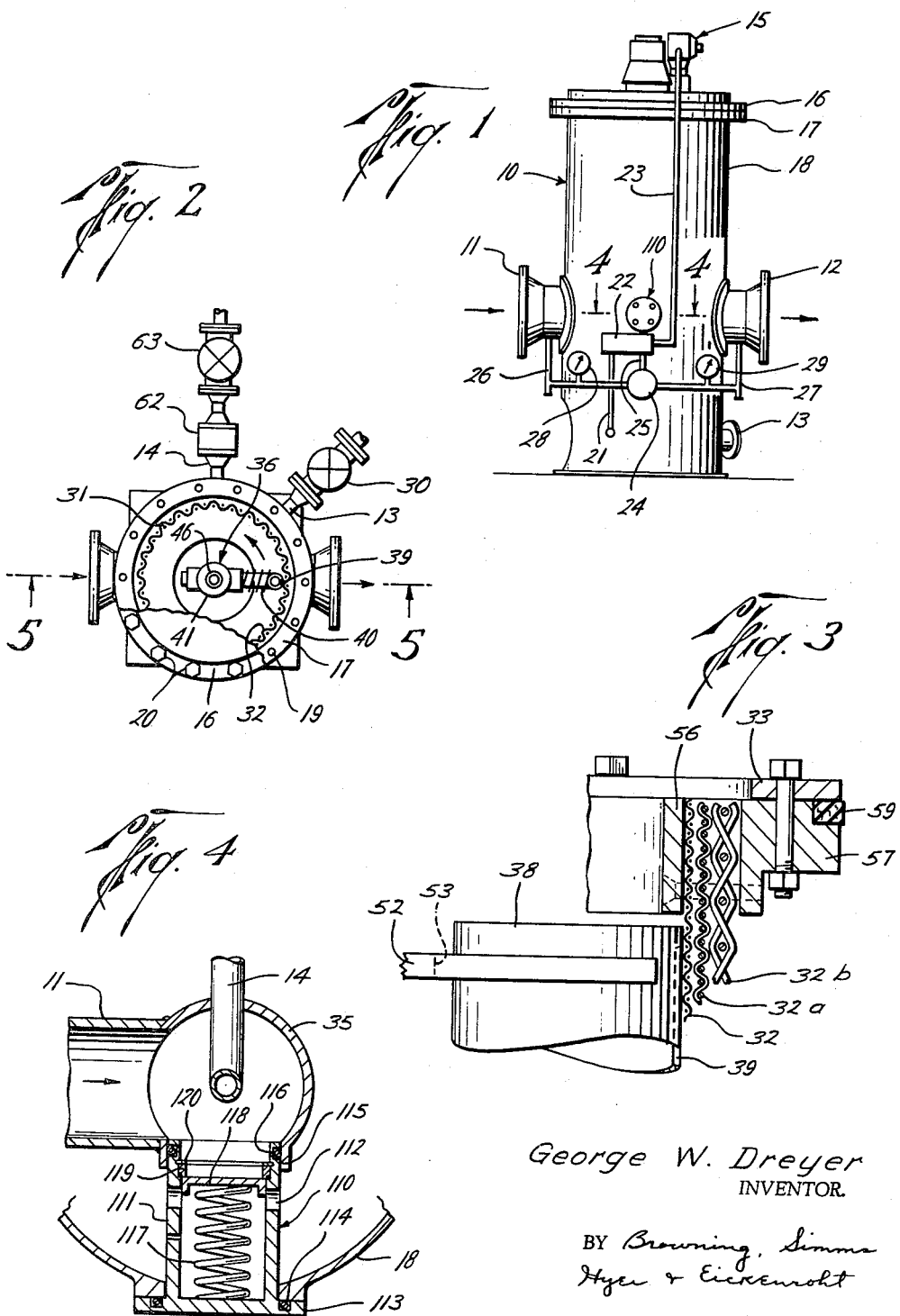
George W. Dreyer
INVENTOR.
BY Browning, Simms
Hyer & Eickenroht
ATTORNEYS

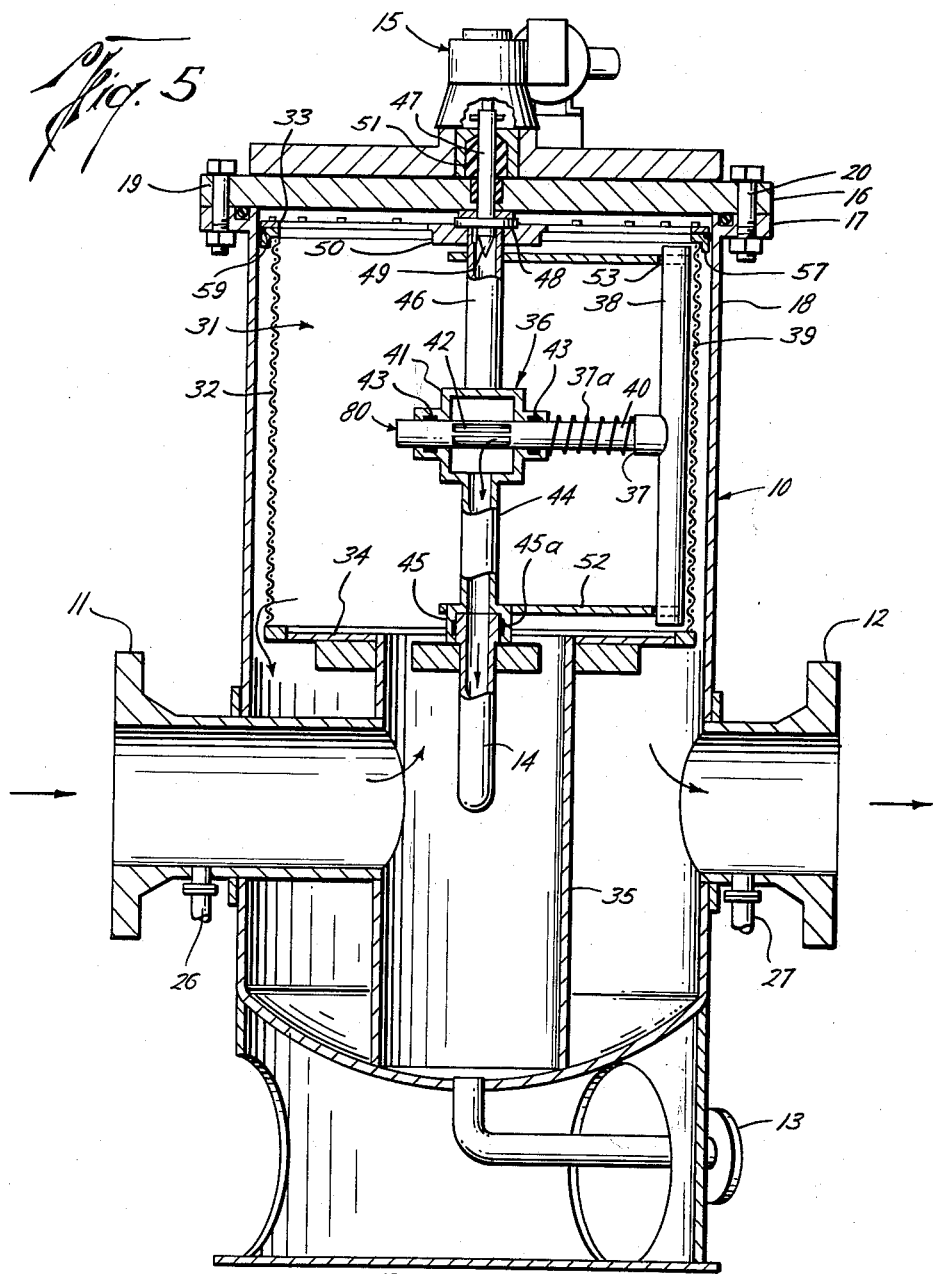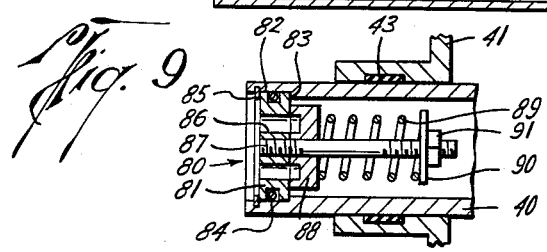

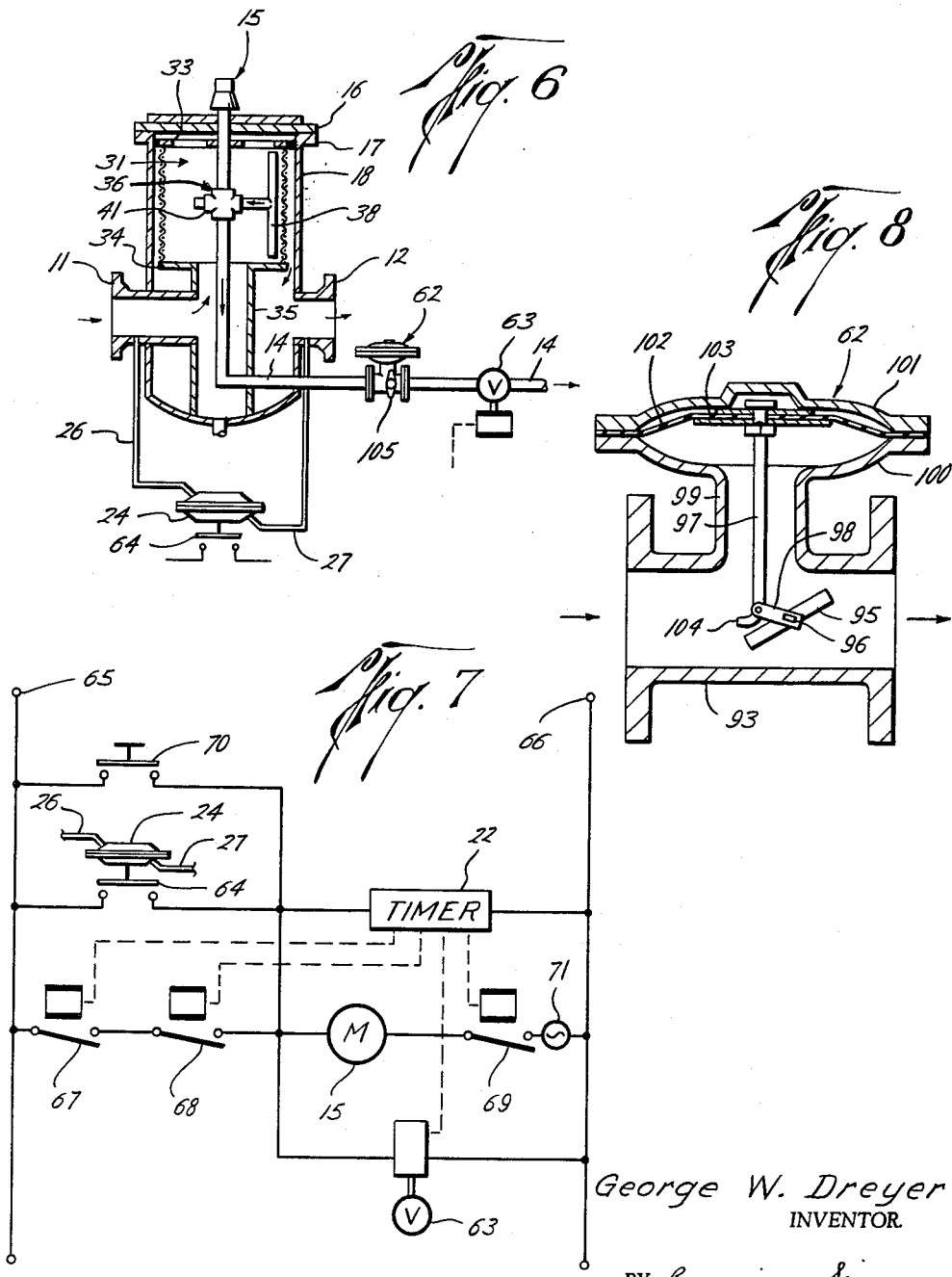

United States Patent Office 3,168,467
Patented Feb. 2, 1965

3,168,467
SELF-CLEANING STRAINERS
George W. Dreyer, P.O. Box 12034, Houston, Tex.
Filed July 20, 1962, Ser. No. 211,331
4 Claims. (Cl. 210—108)

This invention relates to self-cleaning strainers of the type in which the filtering element may be cleaned while the strainer is in continuous service. The present application is a continuation-in-part of my prior co-pending application Serial No. 859,065, filed December 11, 1959, now abandoned, and entitled "Method and Apparatus for Self-Cleaning Strainers."

Self-cleaning strainers of the type where the fluid flow is from the interior of a cylindrical filter element outwardly through its walls and having a rotating cleaning shoe mounted within this filter for cleaning the filter are generally known and require a suction opening or cleaning slot to be in close engagement with the filter element. A close engagement of the cleaning slot customarily found in such a shoe, with the filter element, is considered to be an essential element in the various forms of these devices. These devices are provided with a variety of means for pressing the slot into close engagement with the filter element and also with means which allow the slot to slide over the filter element without digging into or otherwise damaging the filter element. The method of these devices is to clean the filter element by backflowing a fluid through the filter to dislodge the materials trapped on and in the filter. Many of the filter elements of these units are composed of a fibrous material, such as steel wool. However, many of these devices use a material such as porous metal or ceramics to form an inherently rigid filter element.

It has been found that the backflow cleaning principle for cleaning filter elements, such as woven wire or cloth, filter paper or other similar materials tends to disrupt and deflect the filter element into the slot when subjected to high backflow velocities or pressures. As a result the filter must be stiffened to withstand these high velocities or pressures or it must be cleaned continuously. These factors prevent high operating and cleaning efficiency of the filter unit.

In my prior co-pending application Serial No. 859,065 there was disclosed a means for protecting the filter elements from high differential cleaning pressures in the form of bearing rollers on the cleaning nozzle engaging tracks on the screen mounting to space the nozzle away from the filter element somewhat. This permitted fluid to enter the nozzle without passing through the filter element and thus prevented large differentials of pressure across the filter element due to the cleaning force. It also prevented the nozzle from rubbing hard upon the filter element and damaging it and provided for much of the cleaning action to take place using unfiltered fluid. Nevertheless, it prevented close engagement of the nozzle with the filter element at times when the same is needed.

An object of this invention is to protect the filter element as well as the entire cleaning mechanism from excessive cleaning pressure differentials.

It is a further object to do this without losing the advantages of the close engagement of the nozzle with the filter element when needed.

Another object is to avoid excessive flow of cleaning fluid.

In addition to the preceding deficiencies arising from the backflow cleaning method, there exists a second problem in these types of filters, that of insuring the cleaning of the entire filter element.

A number of these devices have been converted to automatic operation. Both constant and periodic cleaning have been provided by such automatic operation. Neither constant nor periodic cleaning insures high filtering efficiency in the unit.

Some of these devices have been arranged for automatic control using pressure differential control elements to control the cleaning cycle. When, in these devices, a pressure differential across the filter is built up to a predetermined value, the cleaning cycle is initiated and when the pressure differential reaches a lower and more satisfactory value, the cleaning cycle terminates. Thus, if a filter is only clogged to the extent necessary to activate the pressure differential control, cleaning only a portion of the entire filter element can reestablish the normal operating pressure differential across the filter element, thereby stopping the cleaning and the remainder of the filter element goes uncleaned. After such a partial cleaning the filter cannot operate at maximum efficiency because only a portion of the entire filter element will have been restored to maximum filtering flow with efficient removal of materials carried in the fluid stream.

It is, therefore, an object of the present invention to provide a self-cleaning strainer for removing materials from a fluid stream in which the filter element is cleaned while the strainer remains in service.

Another object is to provide a self-cleaning strainer in which the increasing pressure differential across the filter element as it clogs activates the cleaning cycle and reduction of the pressure differential to a lower predetermined value during the cleaning cycle terminates the cycle, but does so only after the entire surface of the filter element has been cleaned at least once.

Yet another object is to provide a self-cleaning strainer in which the entire surface of the filter element is repeatedly cleaned during the cleaning cycle until the efficiency of the filter element is restored.

A different object is to provide a self-cleaning strainer in which the filter element is cleaned without significantly reducing the efficiency of the strainer.

Another object is to provide a self-cleaning strainer in which the filter element is cleaned by fluid to be filtered and fluid which has been filtered.

A different object is to provide a self-cleaning strainer in which the filter element is cleaned without distorting the shape of the filter element.

Yet another object is to provide a self-cleaning strainer in which the wear on screens and supports and the damage to out of round filter elements from the passage of a suction-type rotary cleaning shoe over the filter is eliminated.

Another object is to provide a self-cleaning strainer in which the entire surface of the filter element is uniformly cleaned during each cleaning cycle even if the filter element is out of round or is nonuniformly covered with deposited materials.

These and other objects will become more apparent when read in conjunction with the following detailed description and the attached drawings of a preferred illustrative embodiment of the invention wherein:

FIG. 1 is a front elevation of a self-cleaning strainer embodying this invention with arrows designating the direction of fluid flow through the strainer;

FIG. 2 is a plan of the self-cleaning strainer shown in FIG. 1 with the upper cover partially broken away to expose the interior of the strainer mechanism;

FIG. 3 is a fragmentary enlargement of the filter element and cleaning shoe partially in elevation and partially in section;

FIG. 4 is a partial sectional view taken along line 4—4 of FIG. 1 showing a relief valve for bypassing fluid from the filter inlet to the filter outlet without same passing through the filter element if for any reason the filter element will not pass fluid;

FIG. 5 shows the self-cleaning strainer of FIG. 1 in vertical cross section taken along line 5—5 of FIG. 2 but having the drive motor and gear train mechanism shown in elevation and only partly broken away to show the pivotal connection to the intermediate drive shaft going into the strainer body;

FIG. 6 is a fluid flow diagram of the self-cleaning strainer showing the passages through the strainer, the cleaning shoe discharge conduit, the fluid sensing mechanisms and a discharge valve;

FIG. 7 is an electrical circuit diagram showing the various fluid flow controlling mechanisms and the motor control circuit providing for automatic cleaning cycle control;

FIG. 8 is a cross section through the cleaning fluid rate of flow control valve; and FIG. 9 is a cross section through the relief valve for controlling cleaning fluid pressure differential and preventing excessive cleaning pressure differential and excessive pressure of the cleaning shoe against the filter element.

As shown in the drawings and described in the detailed description which follows, the present invention achieves the results set forth by the objects and has a cleaning shoe in contact with but exerting limited pressure against the filter element. Their relationship provides for cleaning the filter element by a through flow or backflow through the element. The entire filter element is cleaned by moving the cleaning shoe about the surface of the filter element.

An automatic cleaning cycle control is provided so that the filter element is cleaned completely when the filter element efficiency is reduced to a predetermined degree.

The automatic cleaning cycle control initiates the cleaning upon an increase in the pressure differential between the inlet and outlet fluid pressures on the sides of the filter element. The control terminates the cleaning upon the pressure differential being reduced to a predetermined lower value such as occurs when the filter is cleaned but only after the entire surface has been cleaned at least once.

Referring to the drawings, a detailed description of a preferred embodiment of the present invention will be given. Referring now to FIG. 1, the self-cleaning strainer 10 is provided with an inlet connection 11 and an outlet connection 12, and a sump line 13. It also has a cleaning shoe discharge line 14 shown in FIG. 2. The cleaning shoe discharge line 14 extends to a point outside of the body 18 and has a rate of flow control valve 62 and solenoid controlled shutoff valve 63. An electric motor and a right-angle gear drive train unit 15 is positioned on the upper cover 16. A flange 17 is provided on the body 18 of the strainer 10. Matching holes 19 are provided in flange 17 and the upper body cover 16 so that the two may be secured together by any convenient means such as the bolts 20, which can best be seen in FIG. 5.

An electrical conduit supplying power to the strainer 10 and its cleaning cycle operating and control mechanism is designated by the numeral 21 and is connected to timer 22. An electrical conduit 23 connects the timer 22 with the electric drive motor unit 15. A pressure differential sensing element 24 for operating a switch 64 (FIG. 7) is connected by electrical conduit 25 to the timer 22. A fluid conduit 26 connects sensing element 24 to inlet 11 and fluid conduit 27 connects this sensing element 24 to outlet 12. The structure and function of this sensing element will be described more fully hereafter. An inlet pressure gage 28 is connected to fluid conduit 26 and an outlet pressure gage 29 is connected to fluid conduit 27. Gage 28 provides a convenient method of monitoring the inlet pressure of inlet 11 and gage 29 likewise monitors the fluid pressure in outlet 12. The inlet 11 and outlet 12 are provided with complementary means such as flanges for connection to the respective connections of inlet fluid and outlet fluid lines. These connections may be similar to the flanged and bolted connections of the upper cover 16 and flange 17.

A means for controlling the flow through the sump line 13 is provided and may be a valve 30 (FIG. 2) or merely a plate covering the opening of line 13. The function of the sump line 13 is to permit draining of the entire body of upstream fluid contained therein whenever it is desirable. Since the use of this line is infrequent, a metal plate or cover may be entirely satisfactory for closing this line against flow and the expense of a valve 30 may be avoided.

Referring now to FIG. 5 a detailed description of the interior construction of the self-cleaning strainer 10 will be given. A filter basket 31 is positioned within the interior of the body 18. The filter basket 31 has a filter element or screen 32 disposed between an upper spider 33 and a lower cover 34. The spider 33 and cover 34 may be of any material provided it does not have openings larger than the openings in the filter screen 32. The filter screen 32 has a circular cross section centered on a straight-line axis and preferably takes the form of a cylindrical surface. The spider 33 and cover 34 would in this construction, therefore, form the top and bottom of the cylinder having a cylindrical surface comprised of filter screen 32. The lower cover 34 of the filter basket 31 has an opening which is connected to the fluid inlet 11 by means of conduit 35. This opening is preferably coaxial to the axis of the filter basket so that the flow is uniformly distributed into the basket. The conduit 35 is secured to lower cover 34 and to the bottom of the body 18 by any convenient means such as by welding or bolting. The inlet 11 is similarly connected to conduit 35. Thus the fluid flow entering by means of inlet 11 will pass through conduit 35 into the interior of filter basket 31. The lower portion of conduit 35 will act as a sump since the fluid entering through conduit 35 loses velocity and has its direction changed. The larger materials carried by fluid coming into the conduit 35, if of sufficient size and weight, will fall to the bottom of the sump due to this change of velocity and direction of the carrying fluid. Whenever it is desired to remove the materials residing in the sump or to drain the inlet fluid system, it may easily be done by opening valve 30 or the like (FIG. 2) on sump line 13.

The filter screen 32 is spaced apart from the adjacent side walls of body 18 by a distance sufficient to permit flow from the interior of filter basket 31 outwardly through screen 32. The outlet 12 is fluidly connected to the exterior surface of filter screen 32. The inlet 11 joins conduit 35 and passes into the interior of basket 31 effectively dividing the interior of body 18 into an inlet and outlet system. The arrows designate the fluid flow through the self-cleaning strainer 10 and it is noted that fluid passes through inlet 11 into conduit 35 up through the opening in the lower section 34 into the interior of the filter basket 31, outwardly through the filter screen 32 and thence to the outlet system where the fluid passes out of the self-cleaning strainer 10 by means of the outlet 12. Material suspended in the inlet fluid of such a magnitude that it can be removed by the filter screen 32 will be first embedded within the openings in the filter screen 32 and thereafter will accumulate on the inner surface of filter 32. Thus a layer will tend to build up on the inner or upstream surface of the filter screen until practically all efficient filtering action ceases. The resultant pressure differential between inlet and outlet pressures under this condition can be used to determine when the filter needs to be cleaned of these materials to restore its filtering efficiency. Moreover, it is preferred that the screen be cleaned some time previous to its being completely clogged by the material removed by the filter screen 32. The pressure differential at which cleaning is initiated should be that optimum pressure differential determined by the over-all operating efficiency of the strainer in which the filter screen is used providing for the maximum over-all efficiency.

The means for cleaning the interior of the screen are designated by numeral 36 and are shown partially in elevation and partially in section. The cleaning means 36 is mounted within the filter basket 31 in such a manner that it may be rotated by the electric motor and gear drive unit 15 and be fluidly connected to a cleaning shoe discharge line 14. More particularly, the cleaning means 36 includes means to move certain cleaning elements about the filter screen 32, bearing means mounting these elements for rotation, and means to withdraw fluid from within the body 18 of strainer 10 through a cleaning shoe 37. The withdrawing of fluid through the cleaning shoe 37 is herein denoted as aspiration and includes the use of a suction pump to remove this fluid and other methods such as venting the line 14 to a lower pressure than exists with body 18 or having line 14 vented to a constant pressure system and increasing the pressure with body 18 to create the desired flow. The preferred way of withdrawing fluid is by venting line 14 to an atmospheric pressure system when the body 18 is operated at pressure above atmospheric pressure and of such magnitude as to cause the necessary flow.

The rotating cleaning shoe 37 has an elongated suction nozzle 38 which is provided with a suction slot or opening 39 along one side and preferably of the same length as the length of filter screen 32. It has been found that a 1/8-inch slot extending the length of the nozzle 38 is satisfactory. The suction opening 39 in suction nozzle 38 is positioned facing and in contact with the filter screen 32 or material collected thereon in use as will be hereafter more fully discussed and described. A hollow arm 40 extends away from suction nozzle 38 in a direction opposite the suction opening 39 of nozzle 38 and passes into and through a coupling 41. It communicates with the interior of the coupling 41 through lateral slots 42 in the arm 40 within the coupling 41. Since arm 40 passes completely through the coupling 41 and is exposed to the exterior thereof at both ends, variations of pressure within the coupling will not tend to move arm 40 endwise. Fluid seals 43 are provided in coupling 41 to seal about the hollow arm 40. The seals 43 should not be of a construction or a material which would prevent movement of the hollow arm 40 back and forth in coupling 41 so as to permit the nozzle 38 to move away from and toward the filter screen 32. The coupling 41 is fluidly connected to the cleaning shoe discharge line 14 by means of conduit 44. A bearing member 45 provides both a bearing surface and a fluid seal between conduit 44 and conduit 14. The bearing 45 rotates with conduit 44 about the upper portion of line 14. Fluid seals 45a are provided between bearing member 45 and the upper portion of line 14 to prevent the leakage of fluid between these members.

A drive shaft 46 is secured to coupling 41 to provide the journal means for connecting the cleaning means 36 to a rotation means such as the electric drive motor and gear train unit 15. The drive shaft 46 may extend through the upper basket spider 33, the upper body cover 16 and be coupled directly to the rotating mechanism. However, it is preferable to utilize the interconnecting mechanism disengageably connecting the rotating means to the drive shaft 46 so that the cover 16 may be removed from the body 18 by merely releasing bolts 20 and lifting the cover 16 up a slight distance away from flange 17 of the body 18 to disengage the intermediate connecting driving mechanism.

The intermediate connecting drive mechanism includes interconnecting drive shaft 47 which is provided with a flanged portion 48, a portion 49 having a keyway for engaging a key in the upper portion of journal shaft 46. The upper spider 33 of filter basket 31 is provided with a thickened portion 50 which provides a supplemental bearing when this method of intermediate connection to the rotating means is employed. A fluid sealing material or packing 51 allows the interconnecting shaft 47 to pass through upper body cover 16 and prevents fluid from escaping from the interior of the body along the shaft 47.

The suction shoe 37 is maintained in an approximately vertical position by a pair of arms 52 which are secured to journal shaft 46 and conduit 44. Slots 53 are provided in the ends of arms 52 for slidably embracing the elongated suction nozzle 38. The cleaning shoe 37 is therefore maintained in a parallel position relative to shaft 46 and conduit 44 but the slots 53 allow it to move toward and away from the filter screen 32.

The suction nozzle 38 is permitted to bear against the filter screen 32 as it rotates about the surface of the filter screen as shown in FIG. 5. However, it is prevented from bearing too heavily on or creating too great a pressure differential across screen 32 by a relief valve 80 which permits bypassing of fluid from the upstream side of the screen to the interior of the cleaning system when the pressure differential therebetween reaches a predetermined maximum, and by a flow rate control valve 62 controlling rate of eduction through the cleaning system within limits.

The valve 80 may be mounted at any point where it will upon opening permit passage of fluid from within the filter element around the outside of the cleaning apparatus, into the inside of the cleaning apparatus so as to prevent excessive pressure differential between these two spaces. As hereinbefore stated, the cleaning shoe 37 is urged into initial engagement with the filter element by means of a spring 37a and as differential of pressure builds up during the cleaning operation between the interior and exterior of the cleaning mechanism this differential of pressure acts upon the cleaning shoe as a whole to force it more tightly into engagement with the filter element, and also causes an increase in the force tending to wash or pull the filter element into the slot in the cleaning shoe. By limiting the extent of the differential which may build up one limits the force with which the cleaning shoe may be caused to press against the filter element and thus avoids the damage to the filter element which would be likely to be caused by excessive pressure of the shoe against such element during the traversing operation, and at the same time one limits the force with which the filter element is urged against the cleaning slot in the cleaning shoe.

The valve 80 is shown in FIG. 5 as being located in the end of the hollow arm 40 opposite the location of the cleaning shoe and this valve is illustrated more in detail in FIG. 9.

Referring to FIG. 9, the valve 80 is shown as made up of a base or support member 81 fitted into a counterbored end portion 82 of the arm 40 and resting against a shoulder 83 at the inner end of this counterbored portion. A seal is provided by suitable packing means such as an O-ring 84 between the element 81 and the interior of the arm 40 and the whole mechanism is held in place in the counterbored portion 82 by means of a split ring 85 or other suitable device.

The support member 81 has flow openings 86 therethrough and also a tapped opening 87 adapted to receive a bolt extending inwardly of the arm 40 and providing a guide upon which the valve element 88 may slide toward and away from seated position against the support member 81 and which when in such seated position will close the flow openings 86 therein. Surrounding the bolt inwardly of the valve member 88 is a spring 89 held by a washer 90 and a nut 91 on the end of the bolt so as to constantly urge the valve member 88 to closed position. It will be seen that whenever the pressure differential between the interior of the filter element around the cleaning apparatus and the pressure within the cleaning apparatus exceeds a predetermined maximum for which the tension on the spring 89 may be set, the valve element 88 will move from its seat against the support 81 and fluid will flow rapidly into the cleaning apparatus bypassing the filter element, relieving the pressure differential to protect the filter element.

The valve 62 is inserted in the eduction tube 14 through which the cleaning fluid is withdrawn from the shoe 37 and serves to limit maximum rate of flow through this line. This has the beneficial effect of preventing more than a certain rate of flow into the cleaning shoe through the filter element no matter what the pressure differential might be, and also, when the valve 80 opens as just described, it prevents too rapid a flow from within the cleaning mechanism and thus makes it possible for the fluid entering through the valve 80 to raise the pressure within the cleaning mechanism which might not be possible if excessive flow from the cleaning mechanism were permitted.

Upon reference to FIG. 8 the character of the valve 62 will be apparent. It has a body 93 through which a flowway extends adapted to be connected at its respective ends into a line such as the eduction tube 14. Intermediate the ends of this flowway there is provided a valve disc element 95. This valve disc element is mounted on a pivot 96 carried by the valve body and the valve element may swing about this pivot from a transverse position with respect to the flowway, in which it practically prevents flow, to a position in which it is aligned with the direction of flow through the flowway and offers little impedance to such flow.

Extending transversely of the flowway and through a lateral opening in the valve body 93 is an operating stem 97 secured to a crank arm 98 by means of a pivot so that longitudinal movement of the operating stem 97 will move the valve 95 toward open or closed positions as the case may be. Actually, as viewed in FIG. 8, movement of this operating rod downwardly will tend to move the valve 95 to closed position and to move it upwardly will tend to move the valve 95 toward open position.

The operating rod 97 extends through a lateral extension 99 of the valve housing which terminates in a flared diaphragm receiving bowl shaped part 100. This part 100 has flanges around its periphery adapted to receive similar flanges on another bowl-shaped part 101 so that together they form a diaphragm chamber. Diaphragm 102 is clamped about its marginal edges between the flanges on the parts 100 and 101 and the operating stem or rod 97 is secured to the central portion of this diaphragm by means of washers 103 and suitable nuts or the like on the stem. The stem or rod 97 is hollow and opens at one end into the space on the upper side of the diaphragm 103 and at its other end is open at 104 in a direction upstream within the flow passageway through the valve to act as a Pitot tube.

It will readily be seen that the valve, which is biased by means of any suitable biasing device within a lateral housing 105 so that it tends to remain in open position, will remain in open position so long as the flow through the valve is less than a predetermined maximum. However, when flow through the valve increases to the point that it exerts a sufficient pressure thrugh the Pitot tube 104, this will increase the pressure above the diaphragm 102 and eventually cause the diaphragm to move downwardly. When the diaphragm moves downwardly the operating rod 97 will move downwardly and swing valve 95 through the crank arm 98 toward closed position. This swinging naturally tends to throttle flow through the valve until the flow becomes slow enough that the pressure exerted upon the Pitot tube will no longer move the diaphragm 102 downwardly any further. Thereupon the flow becomes stabilized at whatever value the valve may be pre-set to maintain.

As a further safeguard against damage which might result from excessive pressure differentials or stoppage of flow through the filter as a whole, there is provided a relief valve generally designated at 110 in FIG. 1 and shown more in detail in FIG. 4. This relief valve has a substantially cylindrical housing 111 with lateral openings 112 therein intermediate its ends and a flange 113 on its outer end adapted to seal about the margins of an opening in the side wall of the housing 18 of the filter. It is sealed about such opening by any suitable sealing means such as an O-ring seal 114.

At its inner end the housing 111 fits within an opening 115 in the inlet conduit 35 and is sealed therein by any suitable sealing means such as an O-ring 116. Within the housing 111 and bearing against the closed outer end thereof is a spring 117 which at its inner end presses against the valve element 118 slidably mounted within the housing after the fashion of a piston. The valve 118 when in its position closest to the center of the conduit 35 seats upon a ring 119 to maintain the valve closed. The ring 119 may be retained in position in the inner end of the housing 111 by any suitable means such as a split ring 120.

It will readily be seen that when the pressure within the inlet conduit 35 exceeds that surrounding this conduit and connected with the outlet 12 by more than the value for which the spring 117 is designed, the piston-type valve element 118 will be moved away from its seat and permit passage of fluid from the inlet conduit 35 through the openings 112 to the outlet 12 thereby bypassing the filter element entirely.

As shown in FIG. 3, the screen 32 may be stiffened on its downstream side by wire screens 32a and 32b.

In FIG. 3, the upper spider 33 is provided with a rim 57. The rim 57 is provided with a groove to receive a felt seal 59. The felt seal 59 provides a supplemental fluid seal about upper ring or spider 33 of basket 31 against body 18. The rim 57 is secured to spider 33 by bolts 58 or the like.

The screens are placed between spider 33 and cover 34 and rest against the inner surface of rim 57. To insure that the screens are securely positioned, an anchoring strip 56 is placed against the surface of the screen 32 and can be secured to the rim 57 by any suitable holding means such as the illustrated screws or the like.

A similar screen anchoring arrangement can be used on the lower cover 34 but without the use of a rim having a sealing ring or any means unduly restricting fluid flow coming from between screen 32 and the body 18.

The suction shoe 37 is free to move relative to the filter screen 32. A resilient means, such as spring 37a, may be used to insure that the cleaning shoe is outwardly extended into initial engagement with the filter screen 32. The aspiration of fluid from between the shoe and the screen will produce a lower pressure in this space than on the opposite surface of the shoe and on the end of the arm 40 opposite the shoe, with the result that during aspiration and cleaning there will be a differential of pressure urging the shoe outwardly toward the screen. Thus, an out of round filter basket may be utilized satisfactorily.

The screen utilized in the self-cleaning strainer of the present invention may be of practically any material and of such mesh as to provide a minimum opening to remove the smallest particles of the fluid carried material. A screen made from a 40 x 200 mesh wire cloth has been found satisfactory for most uses. The material of which this screen is composed should be one resistive to corrosion or other deleterious effects to which it may be subjected by the fluid or the fluid carried materials which it will be called upon to filter. When such a fine woven wire screen is used, it is desirable that it be supported on the downstream surface. When so supported it will be less susceptible to be damaged by bulging or rupturing should an excessive surge of fluid pass through the filter. Referring to FIG. 3, such supporting elements are shown and may be of a woven wire cloth having substantially greater openings and providing no filtering function of their own, but merely a supporting function. These supporting wire cloths are designated by the numerals 32a and 32b. The filter screen 32 need not be supported on its upstream side because the cleaning means of this invention does not exert sufficient backflow pressure tending to collapse the filter screen 32 against opening 39. Nylon cloth or filter paper may be used as a filtering screen.

However, superior cleaning of the nylon or paper filter element can be achieved when it is supported on both sides by a supporting screen similar to that used to support the woven wire filter element on the upstream side because a greater washing flow can be used. One of the advantages arising from the cleaning principle of this invention is that practically any type of filtering element or screen can be used.

The shut-off valve 63 controlling flow through the cleaning shoe discharge line 14 is preferably operated by an electric solenoid.

The operation and functioning of the automatic cleaning cycle control insure efficient over-all operation of the strainer by initiating the cleaning cycle upon a predetermined pressure differential arising between the inlet and outlet pressures and terminating the cleaning cycle only after the pressure differential is reduced and only after the entire surface of the filter screen 32 has been cleaned at least once. Additionally, should the filter element 32 fail to be cleaned by one complete cleaning cycle, the automatic control will repeat the cleaning cycle until the predetermined pressure differential is reduced to a desired lower value. If the strainer should become blocked and not clean, and pressure differential should consequently build up beyond a predetermined maximum, the relief valve 110 will open and bypass the entire screen.

Referring to FIG. 1 where most of the elements of the automatic cleaning cycle control are shown and to FIG. 6, showing the flow diagram embodying these elements, a brief description of the automatic control features will be given. The electrical circuit shown in FIG. 7 will also be discussed conjunctively with the flow circuit shown in FIG. 6. During normal operation of the strainer, a small pressure differential exists between the inlet and outlet fluid streams. Under these conditions the pressure differential sensing element 24 is inactive and the electrical switch 64 operated by element 24 is open and the solenoid operated valve 63 is closed. Upon the pressure differential between inlet and outlet pressures reaching a predetermined value, the pressure differential sensing element 24 will close electrical switch 64. When electrical switch 64 is closed, the timer 22 is energized and begins functioning. The energization of timer 22 by the electrical switch 64 results in several solenoid controlled switches being closed. An interlocking switch 67 closes instantaneously when the timer 22 is energized and acts as an interlocking switch paralleling switch 64 in case the pressure differential operated switch 64 is released inadvertently or by the cleaning action of the cleaning shoe removing the pressure differential across the filter screen 32 before the cleaning shoe has made a complete revolution about the interior of the surface of filter element 32. A time interval switch 68 is controlled by the timer 22 and remains closed for a given increment of time such that the cleaning shoe 37 will make one complete revolution about the interior of the filter screen 32 before the timer de-energizes the solenoid operating the switch 68 and opening its contacts. In order to insure that one complete revolution is completed the time interval switch may be set for an interval slightly longer than the time required for one revolution. Simultaneously with the closing of switches 67 and 68 upon the energizing of timer 22, a solenoid controlled switch 69 is closed starting motor 15. At the same time the solenoid operated valve 63 is opened by the timer 22.

Electrical conductors 65 and 66 pass through conduit 21 from the timer 22 to a source of electrical power, such as a source of 110-volt A.C. single phase.

When the cleaning shoe 37 has cleaned a sufficient portion of the filter element 32 so that cleaning efficiency is restored and the pressure differential returns by some predetermined amount toward normal, the pressure differential control switch 64 will open. However, due to the interlocking switch 67, the timer will continue to be energized until the time interval controlled switch 68 opens after the cleaning shoe has made a complete sweep around the entire inner surface of the filter element 32. When the time interval switch 68 opens, the timer is de-energized and all solenoid controlled switches open and the solenoid controlled valve 63 automatically closes.

The pressure differential control switch 64 is paralleled by a manual control push button switch 70 for use in testing the automatic cleaning cycle control features and for cleaning the filter at a pressure differential less than that is necessary to activate the pressure differential sensing element 24 and close switch 64.

The operation of the automatic control when the filter element 32 is not cleaned by one complete sweep of the cleaning shoe around the inner surface of the filter element 32 is very similar with the following difference. When the time interval switch 68 opens and the filter element 32 has not been cleaned enough to restore the pressure differential between the inlet and outlet to normal, the pressure differential operated switch 64 will be closed by the existing pressure differential and immediately re-energizes the timer closing instantaneously interlocking switch 67 and the time interval switch 68, and the motor starting switch 69 and opening the solenoid controlled valve 63.

In this manner the entire surface of the filter is cleaned by at least one sweep of the cleaning shoe 37 every time the automatic control system is energized. This will be repeated, cleaning the entire surface again and again until the pressure differential existing between inlet 11 and outlet 12 returns to its preset normal value. Thus, the entire surface of the filter is uniformly cleaned in each cleaning cycle and should more than one cleaning cycle be necessary to restore normal operating pressure differential between the inlet and outlet, the cycle will be repeated automatically.

The usual overload device, such as circuit breaker 71, is provided in series with the switch 69 for protecting the motor 15.

A timer and a time interval controlled switch are used for convenience in this embodiment since the motor and gear drive unit 15 are operated at a constant speed. Thus, they may be operated for such time interval that the cleaning shoe makes a complete sweep about the filter screen. However, other arrangement may be equally substituted provided the same results are obtained, that is, so the cleaning shoe makes a complete sweep upon activation of the timer and will repeat the cycle until the pressure differential is reduced to a normal value.

The improvements to self-cleaning strainers herein disclosed provide for efficient cleaning of filter elements without removing the filter element or disturbing the normal filtering action of the self-cleaning strainer. The positioning of the suction nozzle in contact with the filter element while preventing it from bearing too hard against the filter element or building up too great a pressure differential thereacross results in some washing flow which removes the accumulated materials on the surface of a filter element and allows the removal of the "keystone" materials embedded in the openings of the filter by a backflow therethrough. The use of this washing and backflow of fluids provides for efficient cleaning of the filter element and efficient operation of the entire filter unit. Additional advantages are that more fragile filter elements can be utilized which heretofore would have been inoperable or would have had a short life in the prior devices. The automatic control features of the present invention provide for cleaning the entire surface of the filter uniformly to restore normal operating efficiency or to repeat the cleaning of the entire filter successively until the efficiency is restored. The problem of cleaning only a portion of the filter is avoided.

The method of cleaning a filter by the invention herein disclosed provides for superior cleaning of any filter element since a very moderate pressure differential creating flow through the cleaning shoe may be utilized. The method of using a washing flow to remove the accumulated materials so that back washing may remove the embedded materials into suspension into the first fluid portion provides greater over-all efficiency and superior cleaning of the filter element.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. In combination with a strainer comprising a hollow body having an inlet and an outlet and a filter element within the body interposed between the inlet and outlet, a cleaning mechanism comprising a cleaning shoe having a suction opening on one side thereof, means movably mounting said shoe with said suction opening facing said element for sweeping movement along and in close proximity to that surface of the filter element which is exposed to said inlet in a cycle sequentially sweeping a predetermined area of said surface, means for withdrawing fluid through said shoe at a rate to sweep filtered deposits from said area of the filter element and clean the same without interrupting flow from said inlet to said outlet through said element, means for initiating said cycle and operation of said withdrawing means, means effective upon actuation of said initiating means for causing operation of said withdrawing means and the sweeping movement of said shoe through a complete cycle, said mounting means including a hollow arm on said shoe disposed transversely to and extending away from the surface of the filter element adjacent the shoe and having a lateral opening therein remote from said element and through which arm fluid is withdrawn by said withdrawing means, and a coupling having opposed openings embracing and slidably sealed to said arm on opposite sides of said lateral opening, the interior of said coupling being connected to said withdrawing means, whereby said shoe may move from and toward said element and, upon actuation of said withdrawing means, the pressure in said body upstream of said element will urge said shoe toward said element.

2. The combination of claim 1 and means limiting the effect of said pressure in urging said shoe toward said element.

3. The combination of claim 1 in which there is an opening between the interior and exterior of said coupling bypassing said suction opening of the shoe, and a relief valve controlling said opening and subject to the differential of pressure between the exterior and interior of said coupling to open when said differential attains a predetermined maximum, whereby said pressure differential will be prevented from exceeding said predetermined maximum and the pressure of said shoe against the filter element will be limited.

4. In combination with a strainer comprising a hollow body having an inlet and an outlet and a filter element within the body interposed between the inlet and outlet, a cleaning mechanism comprising a cleaning shoe having a suction opening on one side thereof, means movably mounting said shoe with said suction opening facing said element for sweeping movement along and in close proximity to that surface of said filter element which is exposed to said inlet in a cycle sequentially sweeping a predetermined area of said surface, means for withdrawing fluid through said shoe at a rate to sweep filtered deposits from said area of the filter element and clean the same without interrupting flow from said inlet to said outlet through said element, said withdrawing means including an automatic flow regulator controlled by the rate of flow through said withdrawing means for maintaining within predetermined limits the rate of fluid withdrawal whereby to insure a rate of withdrawal sufficient for cleaning of the filter element without such excessive rate of withdrawal as would tend to damage said element or inordinately reduce the efficiency of the filter, means for initiating said cycle and operation of said withdrawing means, and relief valve means for bypassing fluid from said body upstream of said element to said withdrawing means when the differential between the pressure within said body upstream of said element exceeds the pressure within said withdrawing means by a predetermined maximum.

References Cited in the file of this patent

UNITED STATES PATENTS

| | | |
|---|---|---|
| 1,848,478 | Haug | Mar. 8, 1932 |
| 2,066,479 | MacIssac | Jan. 5, 1937 |
| 2,153,047 | Leibing | Apr. 4, 1939 |
| 2,219,408 | Benz et al. | Oct. 29, 1940 |
| 2,237,964 | Haught | Apr. 8, 1941 |
| 2,275,958 | Hagel | Mar. 10, 1942 |
| 2,307,949 | Phillips | Jan. 12, 1943 |
| 2,569,748 | De Grave | Oct. 2, 1951 |
| 2,747,741 | Jacobson | May 29, 1956 |
| 2,982,412 | Hirs | May 2, 1961 |
| 3,017,029 | Berninger | Jan. 16, 1962 |
| 3,077,989 | Larkin | Feb. 19, 1963 |